United States Patent Office 2,906,729
Patented Sept. 29, 1959

2,906,729

METHOD FOR COLOR IMPROVEMENT OF POLYMERIC POUR POINT DEPRESSORS

Alexander H. Popkin, Newark, N.J., assignor to Esso Research and Engineering Company, a corporation of Delaware No Drawing. Application August 31, 1953
Serial No. 377,701

8 Claims. (Cl. 260—45.9)

This invention relates to an improved process for the color and odor improvement of copolymeric materials. Particularly this invention relates to a process for the color improvement of lubricating oil additives having the desirable characteristics of improving the pour point and viscosity characteristics of lubricating oils with which they are blended. More particularly this invention relates to an improved process for the stabilization of copolymers of ethylenically unsaturated polycarboxylic acid esters with other polymerizable monomeric materials prepared by copolymerization of the monomers in the presence of a minor amount of a strong acid by a treating step involving the use of minor amounts of a nitrogen-containing neutralizing agent.

The art of lubricating oil additive manufacture has long been familiar with the preparation of polymers and copolymers to form materials useful for improving desirable characteristics of lubricating oils. Of particular interest in recent years has been the development of additive materials for improving the rate of change of viscosity of an oil with a change in temperature, that is, lowering the temperature at which the lubricating oil loses its property of free flow. Such materials as polymers and copolymers of acrylate and methacrylate esters, polymers and copolymers of alpha-beta unsaturated polycarboxylic acid esters, etc. have been found to be very satisfactory for many purposes. It has also been found, however, that the preparation of these polymers and copolymers present many technical difficulties. Foremost among them is the problem of gelation and the formation of oil insoluble products. It is believed that this phenomenon is a result of undesirable cross linking or interlinking of neighboring long chain molecules with the result that the product formed remains a cohesive mass and will not dissolve in the oil used as the blend oil.

It has been found, and is the subject of a pending application, Serial No. 242,577, by Alexander H. Popkin, filed August 18, 1951, now issued as U.S. Patent 2,721,-878, that copolymers having outstanding utility as pour point depressants and viscosity index improvers may be prepared by a process utilizing a small amount of a strong acid in the copolymerization step with the formation of a product which is free from any tendency toward oil insolubility and has increased potency as a pour point depressor and a viscosity index improver.

Generally speaking, copending application Serial No. 242,577 involves the admixture of the materials to be polymerized or copolymerized and subjecting the mixture to the action of a small amount of a strong acid during the copolymerization.

The process is applicable to the polymers and copolymers of copolymerizable materials in general. It has particular advantage, however, when applied to the copolymerization of ethylenically unsaturated polycarboxylic acids with other polymerizable monomeric materials in the presence of peroxide catalysts.

The ethylenically unsaturated polycarboxylic acid esters may be represented by the following formula:

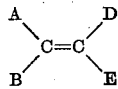

wherein:

(1) A and D are carboxylic acid ester groups

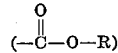

and B and E are hydrogen, i.e., fumaric acid esters, maleic acid esters, etc.
(2) A and D are carboxylic acid ester groups, as above, and either B or E is a methyl group, the other being hydrogen, i.e., citraconic acid esters, mesaconic acid esters, etc.
(3) A and B are hydrogen, D is a carboxylic acid ester group, and E is a methylene carboxylic acid ester group, i.e., itaconic acid esters, etc.
(4) A and D are carboxylic acid ester groups as above, E is a methylene carboxylic acid ester group, and B is hydrogen, i.e., aconitic acid esters.

Although any of the polycarboxylic acid esters, according to the formula above, are operable in the improved process, the alpha-beta unsaturated dicarboxylic acid esters are particularly advantageous. The ester groups of a mixture of alcohols, each having from 8 to 18 carbon atoms, and the mixture having from 12 to 14 carbon atoms per average side chain length are particularly advantageous when a pour depressant is being prepared. The alcohols obtained by the hydrogenation of coconut oil and having an average carbon chain length of 13.5 is commercially available and widely used. The preferred embodiment of this invention involves the use of esters of alpha-beta unsaturated dicarboxylic acids wherein the alcohol components of the mixed ester group contain an average of from 12 to 14 carbon atoms, the coconut alcohols being included within this preferred range.

The process may be used to prepare polymers of the above described materials and useful polymers are formed therefrom. Also very desirable copolymers may be formed by copolymerizing with the acid esters as described above other polymerizable monomeric materials. These materials may be represented by the following formula:

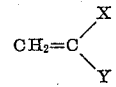

wherein:

(1) X is hydrogen and Y is an ester group

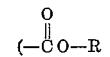

R being methyl, ethyl, butyl, and the like), i.e., vinyl acetate, vinyl butyrate, and the like.
(2) X is methyl and Y is as described above, i.e., isopropenyl acetate, etc.
(3) X is a halogen and Y is as described above, i.e., alpha-chlorovinyl acetate, etc.
(4) X is hydrogen or methyl and Y is an aromatic group, i.e., styrene, alpha-methyl styrene, and the like.
(5) X is hydrogen or methyl and Y is —C≡N, i.e., acrylonitrile, or

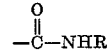

such as acrylanide structures.

Although any of the polymerizable monomeric materials typified by the formula above are operable to form useful copolymers with the acid esters outlined above, the preferred embodiment contemplates the use of low molecular weight vinyl esters and their substitution products. Vinyl acetate is particularly desirable.

Depending upon the desired product, the monomers in the copolymerization reaction may be varied greatly. However, when a copolymer of a dibasic acid ester and vinyl acetate is being prepared, it is desirable that from 2% to 40% of vinyl acetate, preferably 10% to 25%, be used with the dibasic acid. A copolymer of 80% dibasic acid ester with 20% vinyl acetate has outstanding pour depressant qualities.

The process may be applied to any of the well known polymerization techniques. For instance, the bulk-polymerization technique wherein the catalyst used is added directly to the mixture of the monomers alone may be used applying the process of invention. If it is desired, the solution polymerization technique may be utilized, that is, the technique of polymerization in which the monomers are dissolved in an inert solvent, ranging from heavy motor oil fractions to petroleum hydrocarbons, including chlorinated petroleum cuts, etc., and the catalyst added. When the solution polymerization technique is used, it is preferred that the monomer concentration in the diluent range from 30% to 99% by weight, based on the weight of the total mixture. The suspension technique of polymerization or the emulsion polymerization technique wherein an emulsifying agent such as a soap is used to form an emulsion with the monomers and water and a water soluble catalyst is utilized may also be adapted to the process of invention with excellent results.

The reaction conditions to be experienced may also be varied within wide ranges. In the preferred embodiment, the copolymerization of dibasic acid esters with other polymerizable materials, it is preferred that temperatures within a range of from room temperature to 250° F. be used, preferably the equilibrium temperature of the reaction, or that temperature at which the reaction proceeds most smoothly within a characteristic temperature rise, normally between 100° to 200° F. In most instances it will be found advantageous to utilize from .05% to 3% by weight, based on the weight of the monomers, of a peroxide catalyst, with .2% to 2.0% by weight being preferred. Among the operable catalysts are hydrogen peroxide, benzoyl peroxide cumene hydroperoxide, potassium persulfate, lauroyl peroxide, ammonium persulfate, urea hydroperoxide, tert.-butyl hydroperoxide, tert.-butyl perbenzoate, and the like, benzoyl peroxide being used in the preferred embodiment.

The process is specifically directed toward the addition to the monomers of a small amount of a strong acid. The introduction of this acid, to be more completely described below, results in the minimizing or preventing completely the formation of cross links between polymer chains, which would result in a copolymer of appreciable lower pour point depressing potency. If allowed to proceed sufficiently this cross linking would result in the formation of an oil insoluble product.

The strong acids which may be employed comprise the alkyl- and aryl-sulfonic acids, alkyl- and aryl-phosphoric acids, related acids comprising the atoms of the same group as sulfur and phosphorus in the periodic table, strong mineral acids such as sulfuric and hydrochloric acid and the like. Although any of the above described acids may be used, it is preferred to use alkyl sulfonic acids, aryl sulfonic acids, and sulfuric acids. Exemplary of the preferred sulfonic acids are petroleum sulfonic acids, toluene sulfonic acids, and the like. Toluene sulfonic acid and sulfuric acid are especially preferred and are contemplated in the preferred embodiment.

The concentration of acid used in the process will range between .05% to 5.0% by weight based on the weight of the monomers. An especially preferred range is an acid concentration of from 0.5% to 1.5% by weight.

The following example is typical of the process described above.

Into a one-liter round bottomed flask was placed 30 g. of a fumarate ester of a mixture of alcohols obtained by hydrogenation of coconut oil (average carbon chain length 13.5); an acid treated Mid-Continent distillate was added as a diluent. Into the mixture of diluent and ester there was added 7.5 g. of freshly distilled vinyl acetate. To the reaction mixture was added a total of 2.4 g. of benzoyl peroxide. As a copolymerization modifier 1.0% of p-toluene was added and the reaction mixture was heated to about 130° F. for 24 hours. The resulting product was an oil soluble copolymer which had a neutralization number of 2.5 and when blended with an SAE-20 oil in 0.02 wt. percent concentration reduced the ASTM pour point from +15° F. to −30° F.

It has been found, however, that with the copolymeric pour point depressants as described above there is present in the finished product small traces of the strong acids used as the copolymerization modifiers. These small traces of acidic materials adversely affect the color and odor properties of these copolymeric materials on prolonged storage. For example, the color of a copolymer of a fumarate ester with vinyl acetate has been found to become progressively darker and a sharp acidic odor develops if the pour point depressant is stored in the pure form or as a concentrate containing more than 50% of the additive.

It has now been found and forms the object of this invention that these copolymeric materials are stabilized against color and/or odor degradation on storage by small amounts of nitrogen containing neutralizing agents.

These basic nitrogen containing compounds may be used to treat the copolymeric material immediately after the copolymerization step is accomplished. It has also been found efficacious to treat the copolymers after the expiration of some period of time.

The treating step is preferably carried out at temperatures within the range of about −20° to about 200° F. with 70 to 160° F. being especially preferred. The treating time will depend upon the concentration of the nitrogen containing neutralizing agent that is used. Ordinarily it is preferred to use from about 0.1% to 5% of the basic nitrogen compound, percentages being based on the weight of the copolymer treated. In these instances the time of treatment will vary between about 15 minutes to 24 hours, with from 30 minutes to 3 hours being preferred.

The nitrogen containing compounds which have proven to be particularly suited for this color and odor stabilization treatment may be selected from a large class of materials, for instance, ammonia, aliphatic amines such as propyl amine, amyl amine, dodecyl amine or mixtures of amines containing from about 8 to 18 carbon atoms, aromatic amines, heterocyclic nitrogen compounds, such as pyridine, guanidine and its salts, and related compounds.

To show the color and odor stabilizing effect of the treatment of this invention the following examples are given.

A copolymer of about 80% by weight of the fumaric acid ester of a mixture of alcohols having an average chain length of about 13.5 was copolymerized with about 20% of vinyl acetate in accordance with the procedure outlined above, that is, using benzoyl peroxide as a catalyst in the presence of about 1% of toluene sulfonic acid as a copolymerization modifier. This copolymeric material was blended in a naphthenic distillate having a viscosity at 210° F. of about 43 S.U.S. and an ASTM pour point of about +15° F. (Barosa 43) to a 20% concentration. The standard Tag-Robinson color test was performed on this blend and gave a number of 2¾.

The separate portions of the 20% blend were then treated with 0.4% by weight of guanidine carbonate, methyl diethanolamine and a commercial mixture of primary amines having an average of about 16 carbon atoms. The treatment was carried out for about 12 hours at a temperature of about 70° F. After the treatment the treated blend was then filtered and again subjected to the Standard Tag-Robinson color test. The results of these tests are set out in Table I below, lower numbers indicating poorer results. In addition to the treatment outlined above, ammonia was bubbled into a sample of the copolymer-oil blend at room temperature for 60 minutes. The Tag-Robinson color of the sample so treated is also included in Table I.

TABLE I

*Improvement of color of lorol B fumarate-vinyl acetate copolymer blend with basic nitrogen compounds*

| | Additive | Robinson color |
|---|---|---|
| (a) | None | 2¾ |
| (b) | 0.4% guanidine carbonate | ¹9 |
| (c) | 0.4% methyl diethanolamine | 9 |
| (d) | 0.4% Armeen 16-D | ¹8½ |
| (e) | Ammonia | 12+ |

¹ Color maintained at 8½ to 9 Robinson during 1½ years' storage.

It is to be seen that treatment with the nitrogen containing neutralizing agents as described above materially improves the color of the additive-oil blend. Tests also indicate that the odor characteristics of the blend are also improved.

To indicate that the treatment with the nitrogen containing compound does not adversely affect the pour point depressant potency of the copolymeric material, the samples after the above treatment were blended with a Mid-Continent SAE-20 base oil in the regular pour point depressing amounts. The blends were then submitted to the standard ASTM pour point determinations and the results are set out in Table II below. Neutralization number determinations were also run on the samples to show that the treatment with the basic nitrogen compound did not adversely affect the acidity of the copolymer oil blends.

TABLE II

*Potency of copolymer-oil blend treated with basic nitrogen compounds*

| Weight percent additive in copolymer-oil blend pour point depressant | Neut. number | Pour point, ° F. | | | |
|---|---|---|---|---|---|
| | | Weight percent | | | |
| | | 0.025 | 0.020 | 0.015 | 0.010 |
| None | 2.5 | −30 | −30 | −15 | −5 |
| 0.4% guanidine carbonate | 0.6 | −30 | −25 | −15 | −5 |
| 0.4% methyl diethanolamine | 0.9 | −25 | −25 | −20 | −5 |
| 0.4% Armeen 16-D | 1.4 | −30 | −20 | −10 | −5 |

To summarize briefly the instant invention relates to a process for the stabilization of copolymeric materials useful as pour point depressants against color and odor degradation which comprises treating the copolymers with nitrogen containing neutralizing agents. The preferred embodiment of the invention contemplates the treatment with a nitrogen containing base the copolymers of alpha-beta unsaturated dicarboxylic acid esters having from 8 to 18 carbon atoms per molecule with low molecular weight polymerizable monomeric materials such as vinyl acetate, vinyl propionate, vinyl butyrate, and the like, which have been copolymerized in the presence of a peroxide catalyst and a strong acid as a copolymerization modifier.

What is claimed is:

1. A process for the improvement of the color and odor of lubricating oil additives which are copolymers of (A) alpha-beta ethylenically unsaturated dicarboxylic acid neutral esters of saturated monohydric alcohols with (B) low molecular weight neutral vinyl esters, wherein said copolymers had been copolymerized in the presence of a strong acid and a peroxide catalyst which comprises, contacting said copolymers with a minor but color stabilizing amount within the range of 0.1 to 5.0 wt. percent, based on the weight of said copolymers of a basic nitrogen-containing neutralizing agent selected from the group consisting of ammonia and amines.

2. A process according to claim 1, wherein said amine is a $C_8$ to $C_{18}$ aliphatic primary amine.

3. A process according to claim 1 wherein said nitrogen containing neutralizing agent is ammonia.

4. A process according to claim 1 wherein said nitrogen containing neutralizing agent is guanidine carbonate.

5. A process according to claim 1 wherein said nitrogen containing neutralizing agent is methyl diethanolamine.

6. A process according to claim 2 wherein said nitrogen containing neutralizing agent is a commercial mixture of amines having an average side chain length of about 16 carbon atoms.

7. A process for the improvement of the color and odor characteristics of oil-soluble lubricating oil additives which are copolymers of (A) alpha-beta ethylenically unsaturated dicarboxylic acid neutral esters of a mixture of saturated monohydric alcohols containing from 8 to 18 carbon atoms per molecule with (B) 2 to 40 wt. percent of a low molecular weight neutral vinyl ester, which copolymers have been copolymerized in the presence of an excess of alcohol, a strong acid and a peroxide catalyst, the improvement which comprises contacting said copolymers with 0.1 to 5.0 wt. percent, based on the weight of said copolymers, of a basic nitrogen containing neutralizing agent selected from the group consisting of ammonia and amines at a temperature of from −20° F. to 200° F.

8. An improved oil-soluble lubricating oil additive material having pour point depressing qualities consisting of a copolymer of (A) a neutral ester of an alpha-beta ethylenically unsaturated dicarboxylic acid and a $C_8$ to $C_{18}$ saturated monohydric alcohol with (B) low molecular weight neutral vinyl ester prepared by admixing said monomers, heating the mixture to a copolymerizing temperature in the presence of a small amount of a mixture of a strong acid, an excess of alcohol and a peroxide catalyst, maintaining the reaction temperature near the equilibrium temperature for the desired period of time, recovering from the reaction mixture a copolymeric material, and contacting said copolymeric material with a minor, but color improving amount within the range of 0.1 to 5.0 wt. percent, based on the weight of said polymeric material, of a basic nitrogen containing neutralizing agent selected from the group consisting of ammonia and amines.

References Cited in the file of this patent

UNITED STATES PATENTS

| 2,332,896 | D'Alelio | Oct. 26, 1943 |
| 2,679,493 | Anderson | May 25, 1954 |
| 2,721,878 | Popkin | Oct. 25, 1955 |

FOREIGN PATENTS

| 962,826 | France | Dec. 19, 1949 |